United States Patent Office.

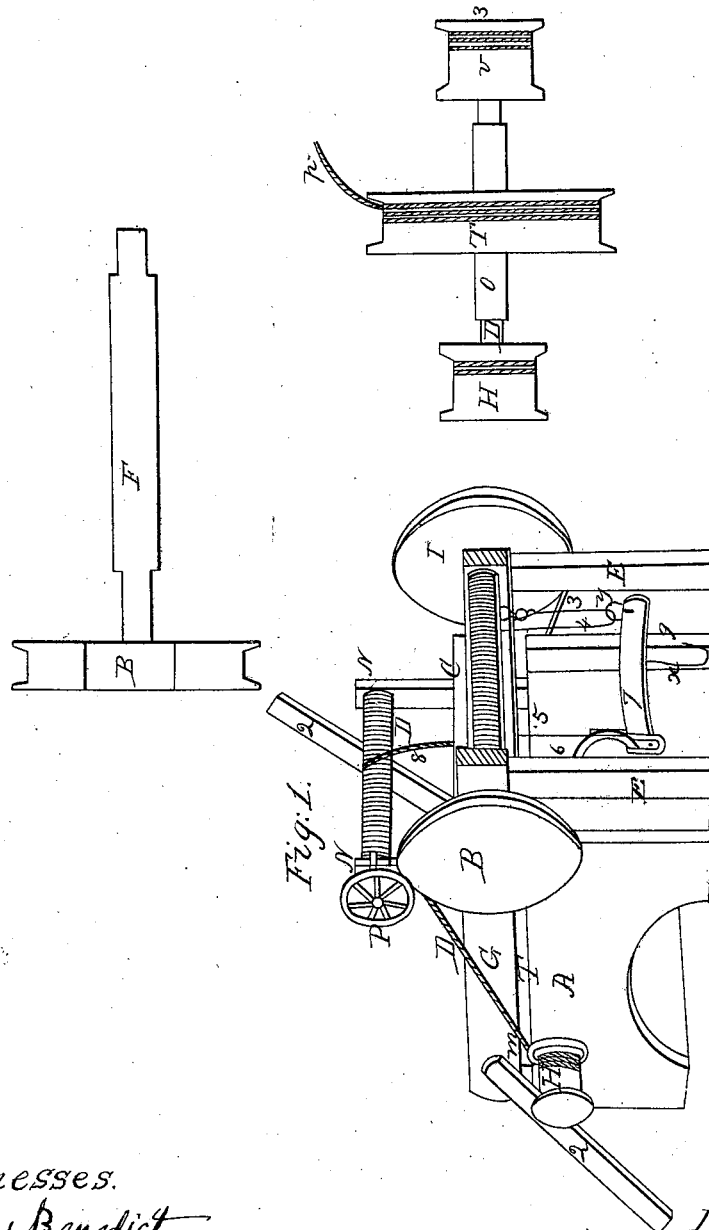

ALBERT GUMMER, OF OMRO, WISCONSIN.

Letters Patent No. 99,311, dated February 1, 1870; antedated January 29, 1870.

IMPROVEMENT IN STUMP-EXTRACTORS.

The Schedule referred to in these Letters Patent and making part of the same.

*To all whom it may concern:*

Be it known that I, ALBERT GUMMER, of the village of Omro, in the county of Winnebago, and State of Wisconsin, have invented a new and useful Improvement in Stump-Pulling Machines; and I do hereby declare that the following is a full, clear, and exact description of the construction and operation of the same, reference being had to the annexed drawings, making a part of this specification, in which each like letter or figure represents like parts of the same machine.

The nature of my invention consists in the use of a secondary frame, and hinged on the top of a main rectangular frame at one end, and resting on two or more legs or supporters at the other end, and on which are set two shafts or rollers, which are connected with each other, by ropes or chains passing through a pulley at one end, and through a hook at the other end, or through a tackle-block at each end, according to a determination in regard to the same. This rope or chain is also connected with a lever, designed to connect, by means of a hook, with the root of the tree-stump. This secondary frame, at one end, is raised and lowered, at pleasure, by means of a windlass, so that the machine, in transit from one place to another, will not be impeded in its motion by the projection of the legs attached to and supporting the same.

By this arrangement, wherever the machine is set, there it will stay, without stays or braces of any kind whatever, notwithstanding there are two accompanying the machine, the power of the machine being so directed as to render it a fact.

To enable others skilled in the art to make and use my invention, I will proceed to describe its construction and operation, in which—

Figure 1 is a perspective view of the machine.

A is a rectangular frame, resting on its ground-bed.

H H is a pulley, fastened on the shaft O.

B B is a pulley, fastened on the shaft F.

I is a pulley, fastened to the shaft C.

D D is a cord, running around the pulleys H H and B B.

3 3 is a cord, passing around pulleys I and V.

T is a pulley, fastened on the shaft O.

p is a cord, passing around the pulley T.

N N are two uprights supporting the roller L.

C and F are two rollers or shafts, to which are attached the cords 5 and 4.

7 is a lever, working between the legs E E.

6 is a tackle-pulley, attached to the lever 7.

L is a roller, working in and between the uprights N N.

P is a hand-wheel, fastened to the roller L.

8 is a cord, running around roller L at one end, and connecting with the hinged frame G at the other end.

2 2 are two stays, fastened to the secondary frame G.

The manner in which this machine is made to perform its labor is as follows:

The frame A is set to its place at the root of the stump, and the stays 2 2 set down to their positions, if required, to secure the position of the frame A. The hook 9 is then hitched to the root of the tree-stump. At the same time, a horse is hitched to the cord p, and made to pull, and the cord p, passing around the pulley T, turns the shaft O, and with it pulleys H H and V; and the cord D D, passing around pulley H H, and connecting with pulley B B, turns the shaft or roller F, the cord D D connecting pulleys B B and H H, in conjunction with cord 3 3, connecting pulleys I and V, and the pulleys I and B B, working simultaneously, by the motion of pulley T, turn the rollers C and F, and the rollers C and F wind up the ropes 4 and 5, and the ropes 4 and 5, being connected with lever 7, by the hook y, and the pulley or tackle-block 6, the lever 7 is drawn up, and consequently the hook 9; the hook 9 being fastened in the lever 7, at one end, and the other end hooked to the tree-stump to be extracted; and when the lever 7 rises, the stump has to do likewise, until pulled out of the ground entirely.

The frame G, working on a hinge at m, is susceptible of being raised up and lowered down by the roller L and cord 8, thus making it convenient to move from one position to another, so that the legs E E do not strike the ground.

The legs E E are set in such a position as to come directly under the two rollers C and F, so to sustain the frame G in the greatest manner, when the same is subjected to the strain it has to undergo when at work. And from the manner in which the stump is pulled, and the direction of the power applied to the pulling of the stump, there is required no anchoring of the frame A; and when the frame A is set on wheels, it is ready to move with dispatch to any required position.

As has been referred to, the lever 7 is susceptible of being connected with a pair of tackle-blocks, in place of the simple power shown, by the ropes 4 and 5, and single pulley 6.

Claim.

What I claim as being new, and desire to secure by Letters Patent, is—

1. The secondary frame G, with the rollers C and F, the pulleys H, H, and V, in connection with the pulleys B, B, and I, and the cord D D and 3 3, when used in the manner described and set forth.

2. The lever 7, with the tackle-pulley 6 and ropes 4 and 5, when used in the manner and for the purpose set forth.

3. The pieces N N, with the roller L, the wheel P, and cord or rope 8, when used as set forth.

4. The stay-pieces 2 2, as and for the purpose set forth.

ALBERT GUMMER.

Witnesses:
W. BLACKBURNE,
CYRUS BENEDICT.